United States Patent [19]
Stockman

[11] 3,921,041
[45] Nov. 18, 1975

[54] DUAL CAPACITOR
[75] Inventor: Robert M. Stockman, Brookfield Center, Conn.
[73] Assignee: American Radionic Co., Inc., Danbury, Conn.
[22] Filed: Feb. 24, 1975
[21] Appl. No.: 552,552

[52] U.S. Cl. .............................. 317/260; 29/25.42
[51] Int. Cl.² .......................................... H01G 4/32
[58] Field of Search.................... 317/260; 29/25.42

[56] References Cited
FOREIGN PATENTS OR APPLICATIONS
425,745    3/1935    United Kingdom................. 317/260
902,864    9/1945    France.............................. 317/260

Primary Examiner—E. A. Goldberg
Attorney, Agent, or Firm—Buckles and Bramblett

[57] ABSTRACT

A dual metallized capacitor and method for making the same. A single capacitor section is wound in the usual manner from two metallized films. After the winding has progressed through the proper number of turns for one of the capacitors, the metallized layer is burned from the surface of one film over a selected distance. An insulated sheet having a length sufficient to encircle the capacitor at least once, is inserted between the film layers to extend beyond one end of the wound cylinder. Winding is then completed and each end of the wound section is metal plated. Two leads are secured to the plated end from which the insulating sheet extends, one lead being placed within, and the other without, the sheet. A single lead is secured to the opposite end of the capacitor section.

10 Claims, 6 Drawing Figures

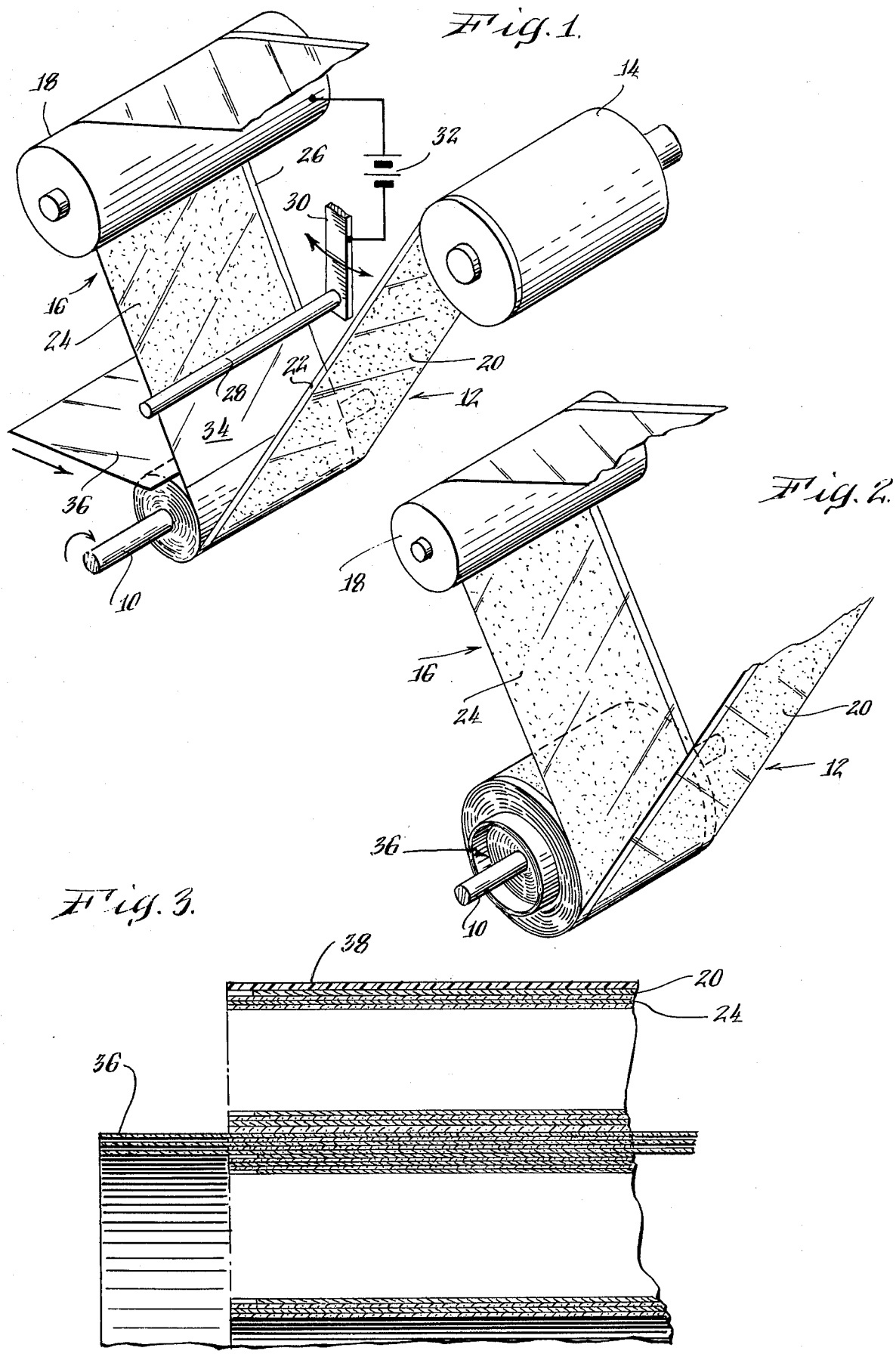

DUAL CAPACITOR

BACKGROUND OF THE INVENTION

This invention pertains to wound capacitors and, more particularly, to such capacitors of the metallized film type. The particular problem to which this invention is directed is to produce a pair of capacitors having one plate in common and occupying the minimum possible volume. It is also desired to wind such capacitors utilizing metallized dielectric film. The manner in which these objectives are achieved will be apparent from the following description and appended claims.

SUMMARY OF THE INVENTION

The method of making a dual metallized film capacitor which comprises providing a supply of a first dielectric film strip, metallized on one side, and a supply of a second dielectric film strip metallized on one side. The first and second strips are wound in substantially cylindrical form with the nonmetallized side of each strip in contact with the metallized side of the other strip. The metallized edge of the first strip is exposed at one end of the cylindrical form, and the metallized edge of the second strip is exposed at the opposite end of the cylindrical form. The metallized layer is removed from the first strip over a region intermediate the ends of the first strip. A sheet of insulating material is inserted between such region and the second strip and is positioned to extend outwardly from one end of the cylindrical form. The sheet has a length sufficient to encircle the circumference of the form at least once. Winding is then continued for a predetermined length of film and terminated. Each end of the capacitor section so formed is then coated with metal. A first electrical lead is then connected to the wound section within the encircling sheet and a second electrical lead is connected outside of such circling sheet.

BRIEF DESCRIPTION OF THE DRAWINGS

FIG. 1 is a perspective view of a capacitor section in accordance with this invention in the process of being wound;

FIG. 2 is a perspective view, similar to that of FIG. 1, illustrating a further step in the winding of the capacitor section;

FIG. 3 is a partial cross-section taken through the capacitor section upon the completion of winding;

DESCRIPTION OF THE PREFERRED EMBODIMENT

Figure 4:
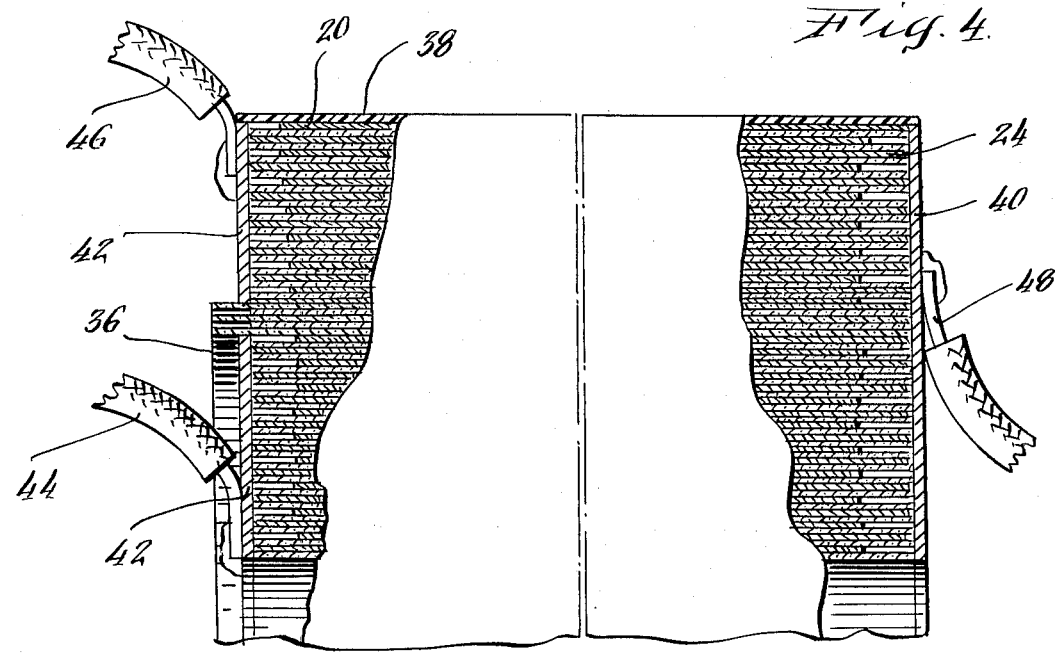
FIG. 4 is a completed capacitor constructed in accordance with this invention in partial cross-section.

There is illustrated in FIG. 1 a capacitor section in accordance with this invention being wound on a conventional winding machine having a rotating spindle 10. A metallized dielectric film 12 is fed from a first supply roll 14, and a second metallized dielectric film 16 is fed from a second supply roll (not shown). Film 16 passes over a cylindrical copper electrode 18. The film 12 carries on its near surface, as viewed in FIG. 1, a thin metallic layer 20 which extends to the right edge of the film but terminates short of the left edge leaving a non-metallized strip 22 therealong. The film 16 similarly carries a thin metal layer 24 on its near surface as viewed in FIG. 1 which extends from the left edge of the film and terminates short of the right edge to form a non-metallic strip 26 therealong. A second electrode 28 is mounted on a moveable arm 30 in such a manner as to be selectively advanced against, and withdrawn from, the metallized layer 24 of film 16. An electrical power source 32 electrically interconnects the electrodes 18,28. The voltage employed is not critical but, in one illustrative embodiment, is 40 volts D.C.

Figure 5:
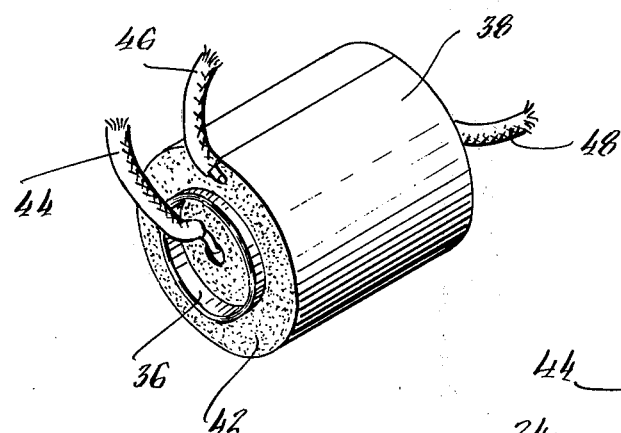
FIG. 5 is a perspective view of a completed capacitor in accordance with this invention.
Figure 6:
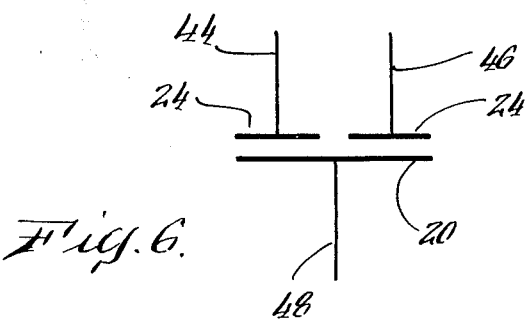
FIG. 6 is an electrical schematic of the capacitor of FIG. 5.

It is an object of this invention to produce a capacitor of the type illustrated schematically in FIG. 6. As will be apparent therefrom, this comprises in essence a pair of capacitors sharing a single plate. To achieve this objective, the two films are wound on the spindle 10 in the conventional manner for a preselected number of revolutions. The number of revolutions depends upon the capacitance desired. If it is assumed that the capacitances of the dual capacitors are to be equal, one-half of the total length of the film to be employed is so wound. At this point the winding machine is stopped and the electrode 28, hitherto retracted from the film surface, is advanced against metal layer 24 of film 16 and voltage applied. The winding process is then continued at a slower speed and the resultant arcing vaporizes the matallic layer, leaving a non-metallized intermediate region 34. The length of the non-metallized region 34 is sufficient to encircle the capacitor section at least once. The electrode 28 is thereafter removed from the surface of film 16. During this interval of winding the region 34 around the capacitor section, there is inserted into the section a non-conductive sheet 36 of a material, such as a plastic. The sheet 36 is not centered along the length of the cylindrical section. Accordingly, as shown in FIG. 2, upon continued winding it forms a circular barrier which extends outwardly from that end of the capacitor section having the metallized edge of film 16. Winding is continued and terminated in the usual manner with the films 12, 16 being cut and the completed section being wrapped by a suitable tape 38. The capacitor section, which is in the condition illustrated in FIG. 3, is metal plated in the conventional manner employed for attaching leads, i.e. the ends are sprayed with molten copper to which a layer of solder is applied. Thereafter, the barrier formed by sheet 36 is trimmed as shown in FIG. 4. The completed section, as shown in FIGS. 4 and 5 includes on one end a copper-solder layer 40 which electrically engages the metallized layer 20 of film 12. The opposite end of the section includes a similar layer 42 which, however, is interrupted by the barrier formed by sheet 36 so that the inner layer engages that portion of metallized layer 24 of film 16 which preceded the formation of region 34 while the outer portion engages the metallized layer 24 which succeeded the formation of the region 34. Thereafter, conductors 44, 46 may be soldered to these regions as indicated. A conductor 48 may be similarly soldered to the opposite end if desired for the particular application.

It is believed that the many advantages of this invention will now be apparent to those skilled in the art. There has been provided a simple, but effective, method for forming dual capacitors of metallized film in a very compact space while simultaneously providing for the attachment of leads while maintaining the separate electrical integrity of the dual capacitors. It will

I claim:

1. The method of making a dual metallized film capacitor which comprises: providing a supply of a first dielectric film strip metallized on one side thereof; providing a supply of a second dielectric film strip metallized on one side thereof; winding said first and second strips in substantially cylindrical form with the non-metallized sides of each strip in contact with the metallized side of the other strip, the metallized edge of said first strip being exposed at one end of said cylindrical form and the metallized edge of said second strip being exposed at the other end of said cylindrical form; removing the metallized layer from said first strip over a region intermediate the ends of said first strip; inserting between said region and said second strip a sheet of insulating material positioned to extend outwardly from said one end of said cylindrical form and of a length sufficient to encircle the circumference of said form at said region at least once; continuing said winding for a predetermined length of film; terminating said winding; metal coating each end of the capacitor so formed; and securing to said one end of said form a first electrical lead within said sheet and a second electrical lead without said sheet.

2. The method of claim 1 wherein said metallized layer is removed by contacting it with an energized electrode and moving said first strip relative thereto.

3. The method of claim 1 wherein said metal coating comprises spraying the ends of said capacitor with molten metal.

4. The method of claim 3 wherein said leads are secured by soldering.

5. The method of claim 2 wherein said metal coating comprises spraying the ends of said capacitor with molten metal.

6. The method of claim 5 wherein said leads are secured by soldering.

7. A dual capacitor which comprises: a capacitor section wound from first and second lengths of metallized dielectric film to form respective first and second layers of metal separated by dielectric film, the metallized first layer extending to the first end of said section and the metallized second layer extending to the second end of said section, a portion of the metallized first layer being removed at a region intermediate the ends of said first length for a distance sufficient to encircle said section at least once; a non-conductive sheet inserted between said lengths and extending outwardly from the first end of said section adjacent said region to form a circular barrier separating the metallized portions of said first length; means for making electrical contact with said first metallic layer within said barrier; means for making electrical contact with said first metallic layer without said barrier; and means for making electrical contact with said second metallic layer.

8. The capacitor of claim 7 wherein said means for making contact with said first layer comprises: a layer of metal deposited on the first end of said section.

9. The capacitor of claim 8 wherein said means for making contact with said first layer comprises: a first electrical lead connected to said metal layers within said barrier; and a second electrical lead connected to said metal layer without said barrier.

10. The capacitor of claim 9 wherein said means for making contact with said second layer comprises: a layer of metal deposited on the second end of said section.

* * * * *